US008392530B1

(12) United States Patent
Manapragada et al.

(10) Patent No.: US 8,392,530 B1
(45) Date of Patent: Mar. 5, 2013

(54) MEDIA STREAMING IN A MULTI-TIER CLIENT-SERVER ARCHITECTURE

(75) Inventors: Srinivas Manapragada, Fremont, CA (US); Stephen Cheng, Foster City, CA (US); Kevin Streeter, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 357 days.

(21) Appl. No.: 12/338,531

(22) Filed: Dec. 18, 2008

(51) Int. Cl.
*G06F 15/16* (2006.01)
*G06F 15/173* (2006.01)
*H04N 5/232* (2006.01)

(52) U.S. Cl. .................. 709/219; 709/239; 348/211.3
(58) Field of Classification Search ............ 709/219
See application file for complete search history.

(56) References Cited

U.S. PATENT DOCUMENTS

| | | | | |
|---|---|---|---|---|
| 5,928,327 A * | 7/1999 | Wang et al. .................. 725/88 |
| 6,047,327 A * | 4/2000 | Tso et al. .................. 709/232 |
| 6,151,624 A * | 11/2000 | Teare et al. .................. 709/217 |
| 6,167,438 A * | 12/2000 | Yates et al. .................. 709/216 |
| 6,260,040 B1 | 7/2001 | Kauffman et al. |
| 6,374,336 B1 * | 4/2002 | Peters et al. .................. 711/167 |
| 6,751,673 B2 * | 6/2004 | Shaw .................. 709/231 |
| 6,889,385 B1 * | 5/2005 | Rakib et al. .................. 725/119 |
| 7,039,048 B1 * | 5/2006 | Monta et al. .................. 370/389 |
| 7,062,567 B2 | 6/2006 | Benitez et al. |
| 7,127,720 B2 * | 10/2006 | Cano et al. .................. 719/310 |
| 7,133,922 B1 | 11/2006 | She et al. |
| 7,139,811 B2 * | 11/2006 | Lev Ran et al. ............... 709/217 |
| 7,302,490 B1 * | 11/2007 | Gupta et al. .................. 709/231 |
| 7,437,364 B1 * | 10/2008 | Fredricksen et al. .................. 1/1 |
| 7,668,901 B2 * | 2/2010 | Franke et al. .................. 709/203 |
| 2001/0045962 A1 * | 11/2001 | Lee et al. .................. 345/745 |
| 2002/0078174 A1 * | 6/2002 | Sim et al. .................. 709/219 |
| 2003/0101238 A1 * | 5/2003 | Davison .................. 709/219 |
| 2003/0105810 A1 | 6/2003 | McCrory et al. |
| 2003/0108030 A1 * | 6/2003 | Gao .................. 370/351 |
| 2003/0233451 A1 * | 12/2003 | Ludvig et al. .................. 709/225 |
| 2004/0090970 A1 * | 5/2004 | Sanchez et al. .................. 370/397 |
| 2004/0136698 A1 * | 7/2004 | Mock .................. 386/123 |
| 2004/0264936 A1 | 12/2004 | Yoo et al. |
| 2004/0267602 A1 * | 12/2004 | Gaydos et al. .................. 705/10 |
| 2005/0038877 A1 * | 2/2005 | Gupta et al. .................. 709/219 |
| 2005/0081246 A1 * | 4/2005 | Barrett et al. .................. 725/105 |
| 2005/0094809 A1 * | 5/2005 | Pedlow et al. .................. 380/200 |
| 2005/0240966 A1 * | 10/2005 | Hindle et al. .................. 725/45 |
| 2006/0156219 A1 * | 7/2006 | Haot et al. .................. 715/500.1 |

(Continued)

OTHER PUBLICATIONS

Shetty et al.; U.S. Appl. No. 11/263,652, filed Oct. 31, 2005, entitled Network Configuration with Smart Edge Servers, 37 pages, to be published by USPTO.

(Continued)

*Primary Examiner* — Moustafa M Meky
*Assistant Examiner* — Blake Rubin
(74) *Attorney, Agent, or Firm* — Fish & Richardson P.C.

(57) ABSTRACT

Systems, methods, and computer program products permit communication between servers in a server system utilizing a proxy stream communicating over a connection between the servers. A first request for content is received, at a server, and a connection is created with at least one upstream server. At the server a name associated with the content at the upstream server is identified. A second request for the content is transmitted to the at least one upstream server, where the second request identifies the name. The content is then received at the downstream server.

28 Claims, 6 Drawing Sheets

U.S. PATENT DOCUMENTS

| | | | |
|---|---|---|---|
| 2006/0195589 A1 | 8/2006 | Vaitl | |
| 2006/0225115 A1* | 10/2006 | Barrett et al. | 725/113 |
| 2006/0248212 A1* | 11/2006 | Sherer et al. | 709/231 |
| 2007/0030818 A1* | 2/2007 | Bahnck et al. | 370/270 |
| 2007/0073937 A1 | 3/2007 | Feinberg et al. | |
| 2007/0124312 A1 | 5/2007 | Simpson et al. | |
| 2007/0130585 A1* | 6/2007 | Perret et al. | 725/46 |
| 2007/0162487 A1* | 7/2007 | Frailey | 707/102 |
| 2007/0206590 A1 | 9/2007 | Baek et al. | |
| 2007/0283043 A1 | 12/2007 | Kiyohara et al. | |
| 2008/0082990 A1* | 4/2008 | Kong et al. | 719/318 |
| 2008/0181107 A1* | 7/2008 | Moorthi et al. | 370/231 |
| 2008/0222281 A1* | 9/2008 | Dilley et al. | 709/223 |
| 2008/0307107 A1* | 12/2008 | Chen et al. | 709/231 |
| 2009/0028148 A1 | 1/2009 | Cao et al. | |
| 2010/0082804 A1 | 4/2010 | Patel et al. | |
| 2010/0146569 A1* | 6/2010 | Janardhan et al. | 725/98 |

OTHER PUBLICATIONS

Shetty et al.; U.S. Appl. No. 11/527,817, filed Sep. 27, 2006, entitled Automatic Live Stream Trees, 20 pages, to be published by USPTO.

U.S. Patent Office, U.S. Appl. No. 12/335,491, filed Dec. 15, 2008, Office Action, dated Aug. 18, 2010, 26 Pages.

Hunter, William E., U.S. Appl. No. 12/335,491, filed Dec. 15, 2008, in Amendment in Reply to Office Action of Aug. 18, 2010, to be published by USPTO at allowance, 15 Pages.

Notice of Allowance and Fee(s) Due in U.S. Appl. No. 12/335,491 mailed Feb. 3, 2011, 10 pages.

* cited by examiner

MEDIA STREAMING IN A MULTI-TIER CLIENT-SERVER ARCHITECTURE

TECHNICAL FIELD

The present disclosure relates to server communication in a multi-tier server broadcasting system.

BACKGROUND

Video on demand (VOD) and audio on demand technologies allow users to select and view/listen to video or audio content at their convenience. On demand systems can be implemented to stream content, which allows a user to view/listen as the content is being streamed, or to download content to a device, such as a computer or digital video recorder (DVR), for viewing/listening at any time. A DVR is a device that records video and audio content in a digital format to a disk drive or other memory medium within the device. DVRs include software for personal computers which enables video content capture and playback to and from the memory medium. DVRs can provide the user with functionality, including play, pause, stop, fast-forward and rewind. Such functionality can enable a user to pause a live video content stream for viewing at a later time. Alternatively, a user can record the live video content stream using the DVR and can playback the recorded video content at any time. DVR functionalities also include enabling a user to seek backwards and forwards within the content stream to view previously played and yet unplayed content.

Many internet service providers (ISPs) offer VOD streaming, whereby a user buys or selects video content and it begins to play almost instantaneously, and/or downloading to a DVR for viewing in the future. VOD streaming is a one-way video transmission over a data network, including the Internet, used to play video clips and video broadcasts. Unlike VOD downloading, whereby movie files are played after the entire file has been downloaded and stored, VOD streaming enables videos to be played shortly after only a small amount of content has been received. VOD can also be employed through a two-tier client-server software architecture model. In a client-server relationship, one computer program, the client, makes a service request from another computer program, the server. The server can provide services to the client computer and its users. Several standard network functions, such as email exchange, web access and database access are based on the client-server model. In addition to the standard network functions, the client can request VOD streaming and/or downloading from the server.

SUMMARY

This specification describes technologies relating to media streaming in a client-server architecture. In general, content can be distributed over interconnected network nodes that can selectively transmit, receive, store and display the content. The interconnected network nodes can either be server or client data processing apparatuses, e.g., computers. The server computers can be organized in a multi-tiered server architecture, where ingest servers, e.g., origin servers, reside at the top level and one or more intermediate and/or edge servers reside at one or more lower levels.

According to some implementations, a server-side stream object residing on an upstream origin server permits the generation of a proxy stream, over a two way connection between downstream and upstream servers, which is used to transmit content downstream in the multi-tier architecture in response to requests downstream, e.g., from a client computer or from a downstream server. The proxy stream is used to communicate requests upstream to one or more servers to request content, and permit the one or more servers to transmit the content downstream. The proxy stream is also used by upstream servers to notify downstream servers with status information, such as if a failover has occurred. Additionally, if a failover has occurred with a particular upstream server, the proxy stream enables the identification of one or more alternate upstream servers that may be able to provide content downstream.

In one aspect a computer-implemented method for communicating between servers in a server system includes receiving, at a server, a first request for content, creating a connection with at least one upstream server, and determining whether the content is available locally at the server. When the content is available locally, the content is retrieved and transmitted to at least one downstream server. When the content is not available locally, a name associated with the content at the upstream server is identified, and a second request for the content is transmitted to at least one upstream server, where the second request identifies the name.

This and other aspects, can be implemented in systems and computer program products, encoded on a computer-readable medium (including application programming interfaces), operable to cause data processing apparatus to perform such operations and can include one or more of the following features.

Particular implementations of the subject matter described in this specification can be implemented to realize one or more of the following advantages. The server-side stream object can include computer program product code facilitating the generation of and use of proxy streams as described herein, including functions such as stream identification, content retrieval, and failsafe operation. The use of the stream object permits content and data to be cached at the intermediate and/or edge servers which reduces the need for upstream devices (e.g., intermediate servers) to access storage, which can result in slowed delivery of large content. Therefore, use of the stream object permits conservation of bandwidth and system resources for high volume streaming of both live and recorded content.

Details of one or more implementations are set forth in the accompanying drawings and the description below. Other aspects can be implemented in systems and computer program products, encoded on a computer-readable medium, operable to cause data processing apparatus to perform such operations. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

The present disclosure described systems, methods, and computer program products to permit the retrieval and playback of recorded and live (or near-live) datastreams in a multi-tier architecture.

A. Multi-Tier Server Architecture

Figure 1:
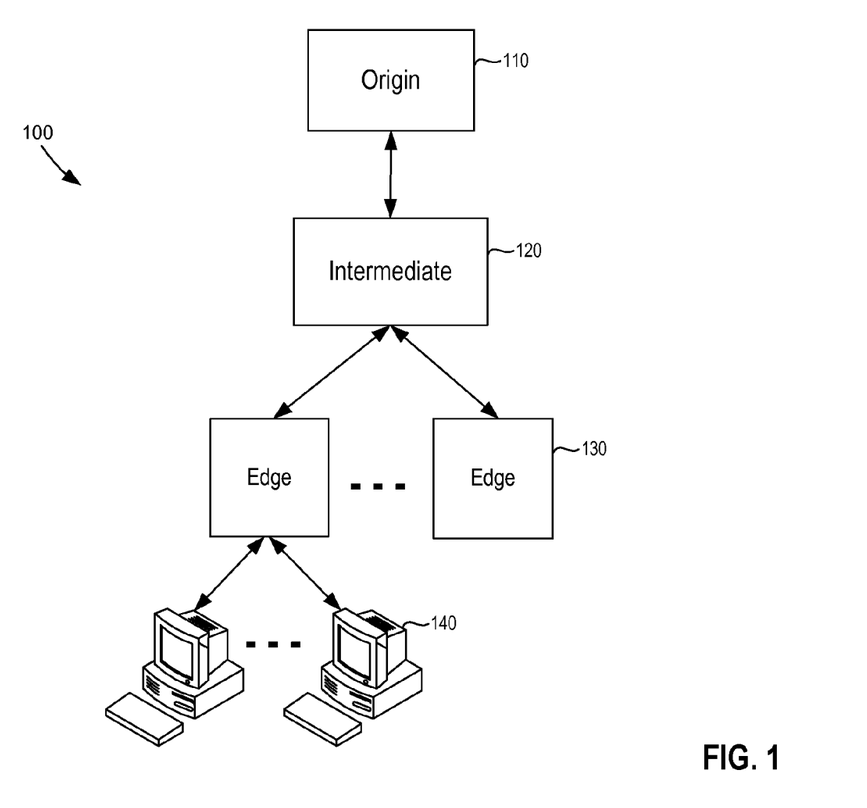
FIGS. 1-2 show examples of multi-tier server architectures.

FIG. 1 shows an example of a multi-tier server architecture 100. The multi-tier server architecture 100 includes multiple network nodes. The multi-tier server architecture 100 can be implemented to include three levels of servers 110-130 and client computers 140. The multi-tier server architecture 100 can be implemented to transmit a datastream to the client computers 140. The datastream can be a live datastream broadcast, a near-live feed, and/or a recorded datastream. The live datastream broadcast can include a plurality of segments. Each of the plurality of segments can include a plurality of video frames and/or audio samples.

The plurality of segments can be transmitted as a near-live feed to servers 120, 130 and the client computers 140. In addition, the multi-tier server architecture 100 can be implemented to transmit a recorded datastream to the client computers 140. The recorded datastream can be formed by storing the plurality of segments. Three types of servers can reside in the multi-tier server architecture 100: an origin server 110; one or more intermediate servers 120; and one or more edge servers 130. According to some implementations, the edge servers 130 may also be referred to herein as edge-origin servers.

In some implementations, the multi-tier server architecture 100 can be implemented in a static tree server structure. In a static tree server structure, downstream servers can transmit requests for content to directly connected upstream servers; downstream servers do not use efficiency algorithms to search for the 'best' upstream server. Servers more proximal to the origin server 110 are upstream servers. Servers that are more distal from the origin server 110 are downstream servers.

The origin server 110 resides at the top level of the multi-tier server architecture 100. The origin server 110 can act as an ingest server and can receive live video, audio and video/audio combinations for broadcast. The origin server 110 can obtain a live datastream including a plurality of segments. In some implementations, the origin server 110 can obtain the datastream by receiving the live data and segmenting the live data into the plurality of segments. In other implementations, the live data can already be segmented when the datastream is obtained by the origin server 110.

The origin server 110 can transmit the segmented live datastream as a near-live feed to intermediate server 120 directly. The origin server 110 also can transmit the segmented live datastream as a near-live feed to the one or more edge servers 130 and client computers 140 directly and/or indirectly through communication network connections in the multi-tier server architecture 100. The live datastream, pre- and/or post-segmentation, can be recorded by a recording device operatively coupled to the origin server 110 and transferred to the origin server 110 via a communication port, i.e., USB, Bluetooth, Ethernet, wireless Ethernet. The live datastream can be stored at the origin server 110.

The origin server 110 can also or alternatively transmit a recorded datastream to the intermediate server 120. The recorded datastream can include a plurality of stored segments, where each of the plurality of segments can include a plurality of video frames and/or audio samples, e.g., recorded from a live datastream.

The intermediate server 120 can reside at the second level of the multi-tier server architecture 100. The intermediate server 120 is connected to the origin server 110 through a communication network connection. The intermediate server 120 can obtain content from the origin server 110. The obtained content can include the live datastream, the near-live feed and/or the recorded datastream.

The intermediate server 120 can store at least a portion of the near-live feed and the recorded datastream locally. In some implementations, the intermediate server 120 can store the content in a memory cache of the intermediate server 120. As additional content is added to and stored in the intermediate server 120 memory cache, older content segments can be displaced when the capacity of the memory cache reaches a configurable storage limit. Older content segments can, in some implementations, be stored in a disk cache so they are not discarded. The intermediate server 120 can transmit the obtained content directly to one or more of the edge servers 130 and indirectly to the client computers 140 through the multi-tier server architecture 100. The intermediate server 120 can be implemented to transmit a request for content to the origin server 110.

The one or more edge servers 130 can reside at the third level of the multi-tier server architecture 100. The edge servers 130 are connected to the intermediate server 120 through a communication network connection. The edge servers 130 can obtain content from the intermediate server 120. The obtained content can include the live datastream, the near-live feed and/or the recorded datastream. The edge servers 130 can store at least a portion of the near-live feed and the recorded datastream locally. In some implementations, the edge server 130 can store the content in a memory cache of the edge server 130. As additional content is added to and stored in the edge server 130 memory cache, older content segments will be displaced when the capacity of the memory cache reaches a configurable storage limit.

The edge servers 130 can transmit the obtained content directly to client computers 140. The edge servers 130 can be implemented to transmit a request for content to the intermediate server 120. In some implementations, the edge servers 130 can have the same functionalities as the intermediate server 120, and thus can be interchangeable with the intermediate server 120.

The client computers 140 are connected to the edge servers 130 through a communication network connection. The client computers 140 can obtain content from the edge servers 130. The obtained content can include the live datastream, the near-live feed and/or the recorded datastream. The client computers 140 can store at least a portion of the obtained content locally, e.g. in a buffer. The client computers 140 can be operated by users that can request the recorded datastream, the live datastream, and/or the near-live feed from the edge servers 130.

Figure 2:
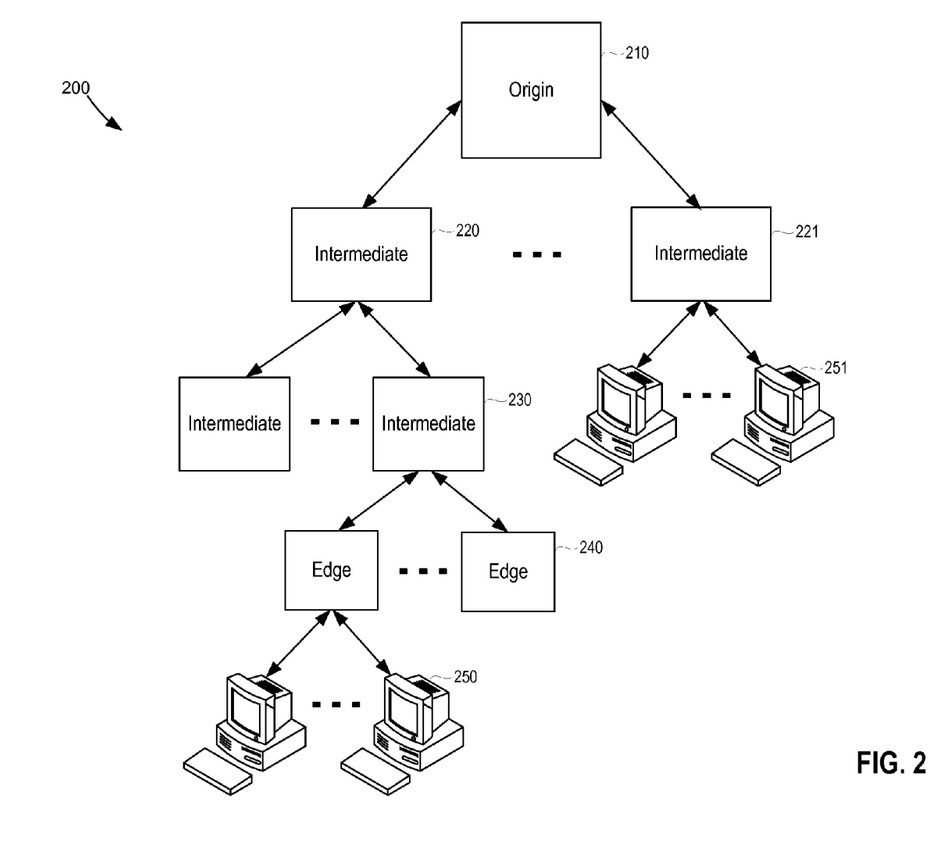

FIG. 2 shows an example of a multi-tier server architecture 200. The multi-tier server architecture 200 includes multiple network nodes. Network nodes 210-240 can be one or more server data processing apparatuses, e.g., computers, and network node 250 can be one or more client computers. The multi-tier server architecture 200 can be implemented to include more than three levels of servers. For example, the multi-tier server architecture 200 can be implemented to include an origin server 210 at the top level, one or more intermediate servers 220 at a second level, one or more intermediate servers 230 at a third level, one or more edge servers 240 at a fourth level and one or more client computers 250. The servers 210-240 and the client computers 250 are connected via communication network connections. Each server can selectively obtain, transmit and store content. Each client computer can selectively obtain, store, display and view content. Users at the client computers 250 can request content from the nearest server, e.g., one of the one or more edge servers 240.

In an alternative implementation, the multi-tier server architecture 200 can be implemented to include fewer than three levels of servers. For example, the multi-tier server architecture 200 can be implemented to include an origin server 210 at the top level, one or more intermediate servers 221 at a second level and one or more client computers 251. The servers 210 and 221 and the client computers 251 are connected via communication network connections. Users at the client computers 251 can request content from the intermediate server 221.

B. Content Retrieval in Multi-Tier Architecture and Server-Side Script

In some implementations content, such as video streams, are recorded by the origin server in the multi-tier server architecture 100, 200 described above, where the origin server is controlled by a content publisher. A server can publish a stream for retrieval by clients or to other servers. For instance, XML data may be pulled into a server-side script to create a playlist and publish it as a stream for retrieval by client computers. A server can publish a stream to another server, for instance, to scale live broadcasting applications to support a greater number of clients. The edge and intermediate servers in such implementations do not record the stream, and thus to not have the recorded stream available for playback. Instead, the edge and intermediate servers retrieve (or fetch) the recorded stream from the origin server.

In some implementations, a server API is used to set up a proxy stream that is used to transmit content downstream in the multi-tier architecture 100, 200 in response to requests downstream, e.g., from a client computer or from a downstream server in the multi-tier architecture 100, 200. As are known in the art, APIs are system-level routines that can be used by an application program for tasks such as basic input/output and file management. In particular, the proxy stream is used to communicate requests upstream to one or more servers to request content, and permit the one or more servers to transmit the content downstream. The proxy stream is also used by upstream servers to notify downstream servers with status information, such as if a failover has occurred. Additionally, if a failover has occurred with a particular upstream server, the proxy stream enables the identification of one or more alternate upstream servers that may be able to provide content downstream.

It will be appreciated that although the server API in a server-side script is described herein with respect to pulling segments of recorded stream from another server, the script may also or alternatively be employed to pull other content from another server. Thus, the reference to segments of recorded streams is for illustrative purposes only.

According to some implementations, a server-side stream object residing on an upstream origin server permits the generation of the proxy stream to retrieve content and status information for the proxy stream over a two way connection between downstream and upstream servers, and between client computers and servers. The object can include computer program product code facilitating the generation of and use of proxy streams as described herein, including functions such as stream identification, content retrieval, and failsafe operation. For instance, the stream object can be executed on the origin server 201 and employed by a script developer on an intermediate or edge server, such as intermediate server 220, 221, 201 or edge server 240, which can aggregate requests from a large number of clients for transmission upstream to the origin server 201. The use of the stream object also permits content and data to be cached at the intermediate and/or edge servers which reduces the need for upstream devices (e.g., intermediate servers) to access storage, which can result in slowed delivery of large content. Therefore, use of the stream object permits conservation of bandwidth and system resources for high volume streaming of both live and recorded content.

Additionally, although described herein with respect to content requests transmitted, for instance, directly from an edge server upstream to an intermediate or origin server, the stream object permits content such as a recorded stream to be transmitted from one origin server to other servers so that a one to one topology is not required between different tiers in the multi-tier architecture 100, 200. As described in greater detail below, the stream object facilitates the publishing of new content name in a local server and specifying that the new name links up to another name on a remote server (e.g., an origin server).

1. Fetching Content Using Proxy Stream

Figure 3A:
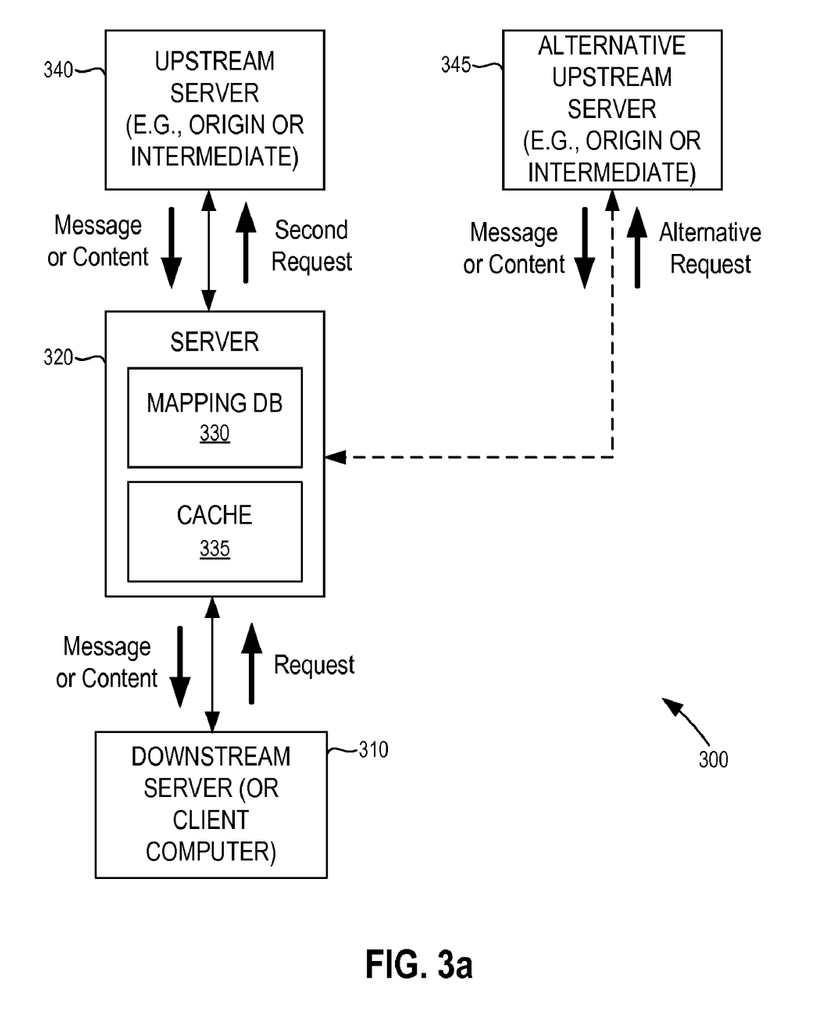
FIG. 3A shows a flowchart of an example process for obtaining content from an upstream server in a multi-tier server system.

FIG. 3a shows a flowchart of an example process 300 for transmitting requests for content, e.g., recorded streams, in a multi-tier server system. The process 300 can, for example, be implemented in the multi-tier server architectures 100, 200 depicted in FIGS. 1 and 2, respectively using a proxy stream using the stream object. The process 300 describes a proxy stream by which upstream and downstream servers can transmit requests for content and also can transmit status messages or the requested content in a multi-tier server architecture.

As shown in FIG. 3a, the downstream server 310 first creates a proxy stream over a connection (e.g. a two way communication connection, e.g., over a communications port) with the upstream server 320. The downstream server 310 can receive a message indicating that the server 320 is unavailable if the connection is unavailable. This may permit the server 310 to connect to an alternative server in a similar manner as described below with respect to communications between the server 320 and the alternative upstream server 345.

After a communication is established, the downstream server 310 can transmit a request to an upstream server (e.g., server 320) for content that is not available locally (i.e., in the downstream server 310). The server 320 can receive the request for content from the downstream server 310 and can determine if the content is available locally, e.g., in a local data storage device or in a memory cache 335 at the server 320. If the content is available locally at the server 320, the server 320 can transmit the requested content to the downstream server 310. The downstream server 310 can store the requested content locally and can transmit the requested content downstream through the communication network to one or more requesting client computers. The client computers can selectively receive, store, display and view the content on a display device operatively coupled to the client computer.

If the content is not available locally at the server 320, the server 320 can transmit a message to the requesting downstream server 310 informing the downstream server 310 that the content is not available locally. The message from the server 320 also can inform the downstream server 310 that the server 320 is transmitting a second request for the content to an upstream server 340.

a. Name Mapping

To retrieve content from the upstream server 340 the server 320 performs a name lookup of the content requested from the downstream server 310. The lookup is performed in a mapping database 330 stored at the server 320, which includes one or more tables associating a content name identified by downstream servers with one or more different names, associated with the same content, by the upstream server 340. The use of the mapping database 330 permits the server 320 to publish a new name for content and to specify that the new name links up to another name on the upstream server. This name translation permits the server 320 to be in communication with multiple upstream servers, possibly associated with different publishers, each having their own naming conventions for content, including copies of the same content.

Although illustrated in FIG. 3a as local to the server 320, the mapping database 330 can also be external to the server and queried, for instance, by the server 320 and/or by the downstream server 310. For instance, the mapping database 330 can be stored in an external database accessed via one or more networks, including the Internet, WANs, LANs, and the like.

Figure 3B:
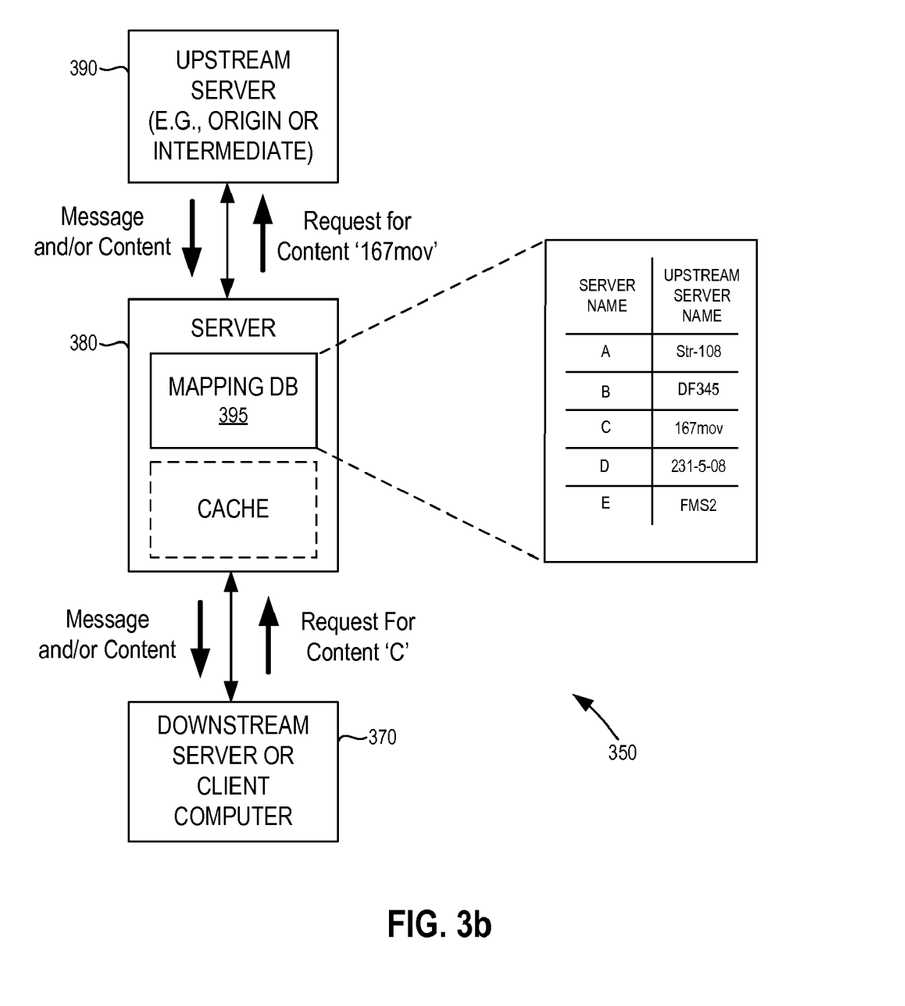
FIG. 3B shows a flowchart of an example process for obtaining content from an upstream server in a multi-tier server system.

FIG. 3b shows a flowchart of an example process 350 for using a mapping database. A downstream server or client computer 370 transmits a request for content having the name 'C', where the request is transmitted over a proxy on a connection between the downstream server or client computer 370 and an upstream server 380. The server 380 receives the request and identifies the content name 'C'. The server 380 then performs a lookup in the mapping database 395 to identify the name of the content in the upstream server 390. In the example shown in FIG. 3b, the upstream server name is '167mov'. Although not illustrated, the name of the requested file can identify file types, e.g., as file name extensions. Subsequently, the server 380 can request the content named '167mov' from the upstream server 390.

It will be appreciated that where there is only a one-to-one topology from a downstream server 370 to the upstream server 390, there is no need to engage in name mapping because the content will be named the same at both servers. For instance, if a client computer requests a stream named 'X', then that name is forwarded to the upstream server (e.g., the origin server), which will respond by transmitting stream 'X'. However, the use of name mapping permits multiple upstream servers, which may provide content to downstream servers and clients even if one upstream server (e.g., origin server) fails, as is described in greater detail below. By not having a downstream server adopt the naming scheme of a particular upstream server, collisions are avoided.

According to some implementations, the name provided to a stream by a downstream server is controlled by a server side action script developer. At the upstream server (e.g., origin) the stream is published with a known name. In some implementations, names can be generated by or received from a content management system or a stream provisioning system. The system does not care, however, what the names are because the translation occurs using the mapping database. Thus, content may be pulled from different networks and insert into the computing system with a different naming convention than the network from which the content is pulled. Additionally, from an API on the requesting side, e.g., at a client computer, types of data may be specified along with content name. Additionally, in some implementations a downstream server or client computer 370 can specify that recorded or live content having a particular name such that the server 380 will request the appropriate version (and not just name) from the upstream server 390.

Referring again to FIG. 3a, after a connection is established with the upstream server 340, the upstream server 340 can receive the second request for content from the server 320, where the second request identifies the content by the name identified by the mapping database 330. The upstream server 340 can determine if the content is available locally, e.g., in a local data storage device or in a memory cache at the upstream server 340. If the content is available locally at the upstream server 340, the upstream server 340 can transmit the requested content to the server 320. However, if the content is not available locally at the upstream server 340, the upstream server 340 can transmit a message to the requesting server 320 informing the server 320 that the content is not available locally. The message from the upstream server 340 also can inform the server 320 that the upstream server is transmitting another request for the content to another upstream server. The mechanism by which a downstream server can request content from an upstream server and the upstream server can transmit either the requested content or a message to the downstream server can continue until the requested content is determined to be available locally at an upstream server.

In some implementations, the message from the server 320 can be transmitted to the downstream server 310 periodically, e.g., every two seconds, to prevent the downstream server 310 from experiencing a time out failure while waiting for the requested content. Similarly, the server 320 can be prevented from experiencing a time out failure while waiting for the requested content upon receiving a message from the upstream server 340. The time out failure limit of each of the servers 310, 320 and 340 can be configurable and can be set to any value. For example, the time out failure limit of the server 320 can be set at, e.g., 0.5 seconds, five seconds or ten seconds.

In some implementations, the server 320 can transmit a message to the downstream server 310 upon receiving a message from the upstream server 340. Receiving a message from the upstream server 340 triggers the server 320 to transmit a message downstream to the downstream server 310. As each message is transmitted downstream, each respective server that receives a message can be prevented from experiencing a time out failure. Thus, the server 320 can relay requests for content to the upstream server 340 and can relay messages to the downstream server 310.

The server 320 can continue to relay messages from the upstream server 340 to the downstream server 310 until the upstream server 340 either retrieves or obtains the requested content and transmits the requested content to the server 320. The server 320 can then transmit the requested content to the downstream server 310 instead of transmitting the continuation message to the downstream server 310. Each respective upstream server 340 can send its own request upstream until an upstream server is found that has the requested content available. Due to the nature of the multi-tier server architecture, the origin server is the last upstream server to receive a request for content from a downstream server. The origin server can transmit the requested content to one or more downstream servers upon obtaining the requested content.

2. Failover Operation

Content may be unable to be retrieved from the upstream server 340 by the server 320 on behalf of the downstream server if two events occur: if a communication connection with the upstream server 340 is impossible, or the upstream server 340 does not have the content requested by the server 320.

If a connection cannot be made with the upstream server 340, the server 320 can transmit an alternative request for content to the alternative upstream server 345. In some implementations the alternative upstream server is an alternative server identified by a server side developer as a backup server. Once a communication with the alternative upstream server 345, the server 345 can determine if the requested content is available locally, e.g., in a local data storage device or in a memory cache at the alternative upstream server 345. If the content is available locally, the alternative upstream server 345 can transmit the requested content to the server 320. The server 320 can store the requested content locally and also can transmit the requested content to the requesting downstream server 310.

In addition to transmitting the alternative request for content to the alternative upstream server 345, the server 320 also can transmit a notification to, e.g., a multi-tier server architecture overview computer system. The computer system can receive the notification(s) from the server 320, can monitor the communication network connections of the multi-tier server architecture, can alert the multi-tier server system administrator to server failure problems as necessary, and can re-route network traffic and/or reconfigure the network. Upon receiving the notification, the computer system can implement failover to a functional upstream server, can replace the non-responsive upstream server 340 with a functional upstream server, i.e., the alternative upstream server 345, and/or can re-route the communication network connections within the multi-tier server architecture to circumvent the non-responsive and/or failed upstream server 340.

Alternatively, if a connection is established with the upstream server 340 but the server 320 does not receive the requested content or a continuation message from the upstream server 340 within a prescribed time limit, the server 320 can send an alternative request for the content to an alternative upstream server 345. The prescribed time limit can be the configurable time out failure limit for the server 320. The configurable time out failure limit can be set to any value. For example, if the upstream server 340 does not transmit the requested content or a continuation message to the server 320 within the configurable time out failure limit of, e.g., ten seconds, the server 320 can transmit an alternative request for content to the alternative upstream server 345. The alternative upstream server 345 can determine if the requested content is available locally, e.g., in a local data storage device or in a memory cache at the alternative upstream server 345. If the content is available locally, the alternative upstream server 345 can transmit the requested content to the server 320. The server 320 can store the requested content locally and also can transmit the requested content to the requesting downstream server 310.

As previously described, in addition to transmitting the alternative request for content to the alternative upstream server 345, the server 320 also can transmit a notification to, e.g., a multi-tier server architecture overview computer system. The computer system can receive the notification(s) from the server 320, can monitor the communication network connections of the multi-tier server architecture, can alert the multi-tier server system administrator to server failure problems as necessary, and can re-route network traffic and/or reconfigure the network.

It will be appreciated that the server 320 receiving the request from a downstream client computer of server can use an alternative upstream server as a fail over alternative. Thus, if there is a disruption on the upstream server 340, such as a crash, the server can reconnect to the alternative server 345, alleviating the downstream client or server 310 from having to handle errors.

3. Status Information

As shown in FIGS. 3a and 3b, messages may be transmitted downstream in addition to requested content. Messages can include status information corresponding to a proxy stream. Status information can include, for instance, the status of a TCP/IP socket, error information, and the like, as well as the above-described messages to effect a timeout mechanism. This permits the use of fail-over procedures such as attempting to utilize an alternative upstream server from which to retrieve content.

4. Example Process

Figure 4:
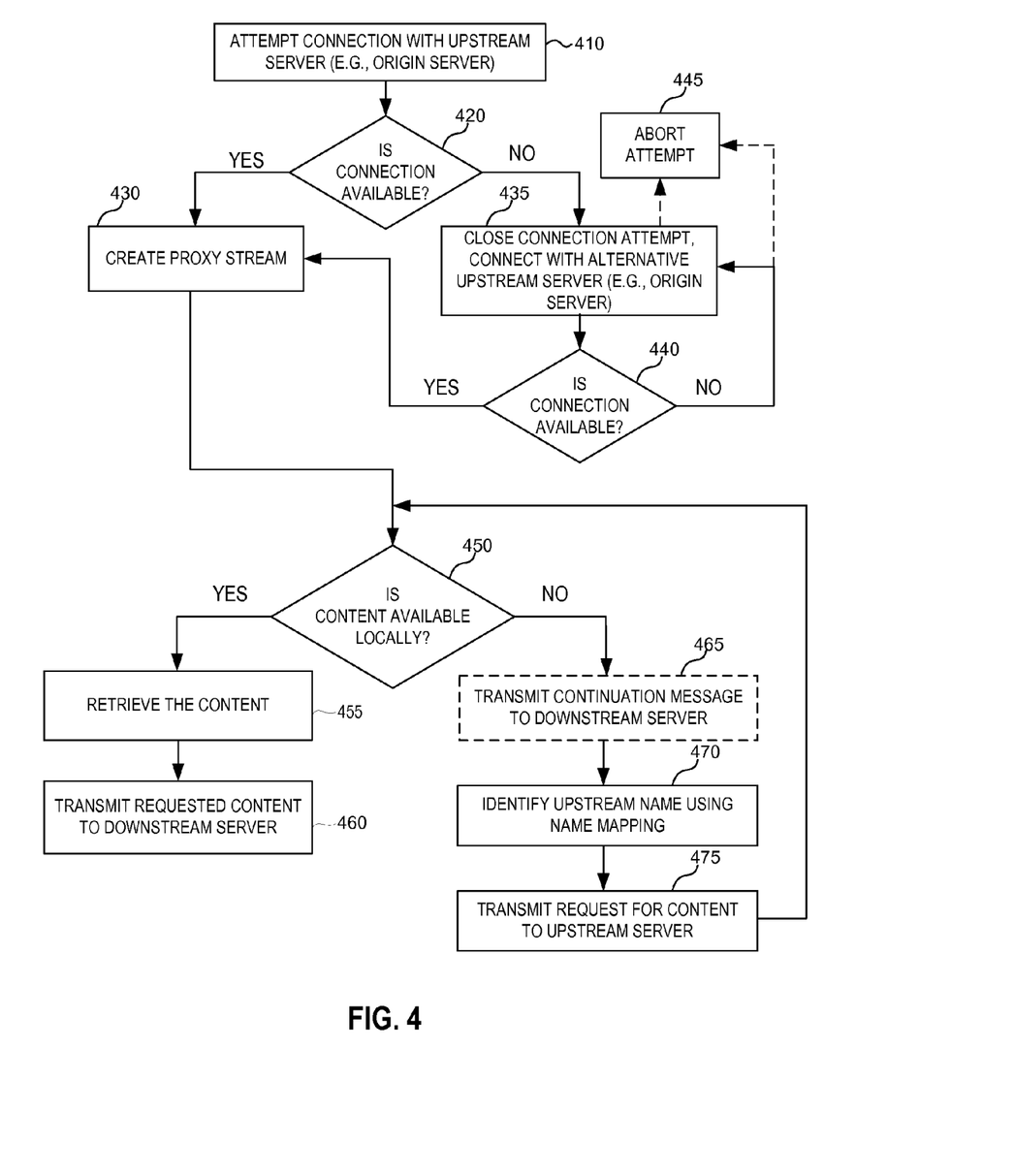
FIG. 4 shows a flowchart of an example process for communicating between servers in a multi-tier server system.

FIG. 4 shows a flowchart of an example process 400 for obtaining content from an upstream server in a multi-tier server system. The process 400 can, for example, be implemented in the multi-tier server architectures 100, 200 depicted in FIGS. 1 and 2, respectively.

After a request for content is received, a downstream server attempts a connection with an upstream server (410). The request can be transmitted from any of the one or more downstream servers in the multi-tier server architecture. For example, the request can be transmitted by an edge server and received at an intermediate server. Alternatively, the request can be transmitted by an intermediate server and received at an origin server. In some implementations, the origination of the request can be from one of the one or more client computers connected through a communication network connection to the multi-tier server architecture. The content can include live datastream broadcasts or recorded datastreams.

If a connection is available, a proxy stream is created (430). If a connection is not available, the connection attempt is closed or ended, and a connection with an alternative upstream server (e.g., an alternative origin server) can be attempted (435). Using the stream object to return status information to the server the alternative upstream server can be automatically identified without identifying the failure or redirect to a client computer. As an alternative to attempting a connection to an alternative upstream server, the attempt my be aborted (445). The process repeats itself until a connection is made and a proxy stream is created (440, 430), or the connection attempt is aborted (440, 445).

The server receiving the request for content determines if the content is available locally (450). In response to receiving the request, the server can determine if the content is available in a local data storage device. Alternatively, in response to receiving the request, the server can determine if the content is available in a local temporary storage location, e.g., a memory cache. The server receiving the request can be any of the one or more upstream servers in the multi-tier server architecture. For example, an edge server can receive the request from another downstream edge server. Alternatively, an intermediate server can receive the request from a downstream edge server.

If the server receiving the request for content determines that the content is available locally, the server retrieves the content (455). The server can retrieve the requested content when the server determines that the content is available in the local data storage device or in the local memory cache. For example, if an intermediate server determines that the requested content is available in its local memory cache, the intermediate server can retrieve the content. Alternatively, an origin server can determine that the requested content is available in its local data storage device and can retrieve the content.

After determining that the content is available locally, the server can transmit the requested content to the downstream server (460). The downstream server can receive the content from the server. In some implementations, the server can transmit the requested content to one or more downstream servers. For example, after determining that the requested content is available locally, an intermediate server can transmit the requested content to a requesting downstream edge server. The edge server can receive the transmitted content from the intermediate server and can store the transmitted content in a local data storage device or in a local memory cache. In response to obtaining the requested content, the edge server also can transmit the content to one or more other downstream nodes, e.g., edge servers and/or client computers in the communication network.

Alternatively, if the server receiving the request for content determines that the content is not available locally, the server optionally transmits a continuation message to the downstream server (465). The server can transmit a continuation message to the requesting downstream server when the server determines that the content is not available in the local data storage device or in the local memory cache. The continuation message can serve as an unavailability notification and can inform the downstream server that the requested content is not available at the server receiving the request for the content. For example, if an intermediate server determines that the requested content is not available locally, the intermediate server can transmit the continuation message to a requesting downstream edge server.

After determining that the content is not available locally, the server can identify the upstream name of the content (470) by a lookup process. The lookup process can be performed in a mapping database stored at the server, which can include one or more tables associating a content name identified by downstream servers with one or more different names, associated with the same content, by the upstream server. The use of the mapping database permits the server to publish a new name for content and to specify that the new name links up to another name on the upstream server. The mapping database can be local or external to the server and queried, for instance, by the server 320 and/or by the downstream server 310. For instance, the mapping database 330 can be stored in an external database accessed via one or more networks, including the Internet, WANs, LANs, and the like.

The server can then transmit a request for the content, using the name identified by the mapping database, to an upstream server (475). The upstream server can receive the transmitted request for the content from the server. For example, after determining that the requested content is not available locally, an edge server can transmit a request for the content to an upstream intermediate server. The intermediate server can receive the transmitted request for the content from the edge server and can determine if the requested content is available locally, e.g., in a local data storage device or in a local memory cache of the intermediate server. If the requested content is available locally, the intermediate server can retrieve the requested content and also can transmit the requested content to the requesting downstream edge server. If the requested content is not available locally at the intermediate server, the intermediate server can transmit a continuation message to the requesting downstream edge server and also can transmit another request for content to another upstream server, e.g., another intermediate server or the origin server.

Figure 5:
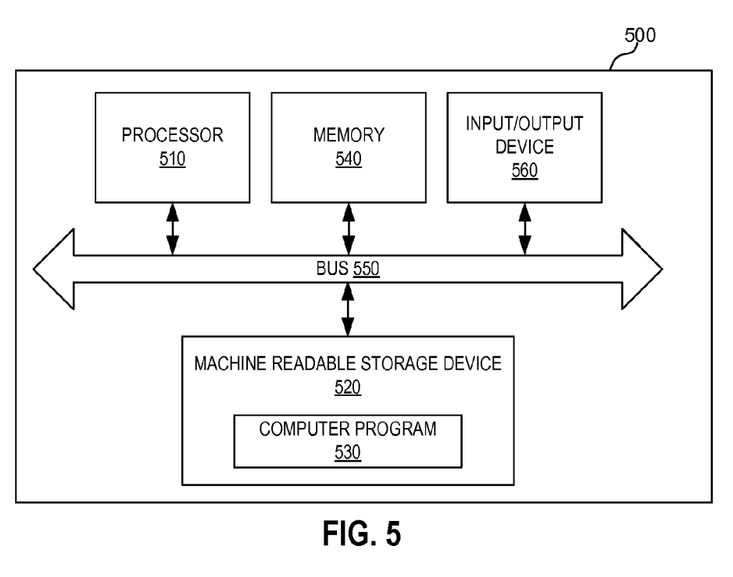
FIG. 5 shows a schematic diagram of an example computer system that can be utilized to implement the systems and methods described herein.

FIG. 5 is a schematic diagram of an example computer system 500 that can be utilized to implement the systems and methods described herein. The system 500 includes a processor 510, a machine-readable storage device 520, a computer program 530, input/output device (e.g., display) 560, and a memory 540. Each of the components 510, 520, 530, and 540 can, for example, be interconnected using a system bus 550.

The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 540 or on the machine-readable storage device 520.

The memory 540 stores information within the system 500. In some implementations, the memory 540 is a volatile memory unit. In some implementations, the memory 540 is a non-volatile memory unit. The machine-readable storage device 520 is capable of providing mass storage for the system 500. In various implementations, the machine-readable storage device 520 can, for example, include a hard disk device, an optical disk device, or some other large capacity storage device.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them.

A computer program (also known as a program, software, software application, script, or code) can be written in any form of programming language, including compiled or interpreted languages, declarative or procedural, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the disclosure have been described. Other implementations are within the scope of the following claims. For example, the actions recited in the claims can be performed in a different order and still achieve desirable results.

What is claimed is:

1. A computer-implemented method for communicating between servers in a server system, the method comprising:
    receiving, at hardware including one or more processors and one or more memory devices effecting a server, a first request for a video content segment of a segmented video stream, where
        the segmented video stream comprises a plurality of video frames and a plurality of audio samples, and
        the first request includes a name for the video content segment;
    creating a connection with an upstream server;
    determining, based on the name for the video content segment, whether the video content segment is available locally at the server;
    when the video content segment is available locally,
        retrieving the locally available video content segment; and
        transmitting the retrieved video content segment to at least one downstream server; and
    when the video content segment is not available locally,
        identifying a different name for the video content segment at the upstream server, which employs a different naming convention for video content segments from the server receiving the first request for the video content segment, wherein the different name for the video content segment is not based on a network resource locator; and
        transmitting a second request for the video content segment to the upstream server, the second request identifying the different name for the video content segment.

2. The computer-implemented method of claim 1, further comprising:
    identifying the different name for the video content segment in at least one mapping database stored locally at the server receiving the first request for the video content segment.

3. The computer-implemented method of claim 1, further comprising:
    identifying the different name for the video content segment in at least one mapping database stored external to the server receiving the first request for the video content segment.

4. The computer-implemented method of claim 1, further comprising:
  transmitting, to the at least one downstream server, a notification that the video content segment is not available locally and that the second request for the video content segment is being transmitted.

5. The computer-implemented method of claim 1, further comprising:
  transmitting an alternative request for the video content segment to an alternative server.

6. The computer-implemented method of claim 5, further comprising:
  identifying another different name for the video content segment at the alternative server, which employs a different naming convention for video content segments from both the server receiving the first request for the video content segment and from the upstream server, and wherein transmitting the alternative request to the alternative server comprises transmitting the other different name for the video content segment at the alternative server.

7. The computer-implemented method of claim 1, wherein the upstream server is more proximal to an origin server than the server receiving the first request for the video content segment.

8. The computer-implemented method of claim 7, wherein the upstream server includes the origin server.

9. The computer-implemented method of claim 8, wherein the at least one downstream server is more distal from the origin server than the server receiving the first request for the video content segment.

10. A non-transitory computer-readable storage medium encoding a computer program product operable to cause data processing apparatus to perform operations comprising:
  receiving, at a server, a first request for a video content segment of a segmented video stream, where
    the segmented video stream comprises a plurality of video frames and a plurality of audio samples, and
    the first request includes a name for the video content segment;
  creating a connection with at least one upstream server;
  identifying, at the server receiving the first request for the video content segment, a different content name for the video content segment at the upstream server, which employs a different naming convention for video content segments from the server receiving the first request for the video content segment, wherein the different name for the video content segment is not based on a network resource locator; and
  transmitting a second request for the video content segment to at least one upstream server, the second request identifying the different name for the video content segment.

11. The non-transitory computer-readable storage medium of claim 10, operable to cause data processing apparatus to perform operations comprising:
  identifying the different name for the video content segment in at least one mapping database stored locally at the server receiving the first request for the video content segment.

12. The non-transitory computer-readable storage medium of claim 10, operable to cause data processing apparatus to perform operations comprising:
  identifying the different name for the video content segment in at least one mapping database stored external to the server receiving the first request for the video content segment.

13. The non-transitory computer-readable storage medium of claim 10, operable to cause data processing apparatus to perform operations comprising:
  transmitting an alternative request for the video content segment to an alternative server.

14. The non-transitory computer-readable storage medium of claim 13, operable to cause data processing apparatus to perform operations comprising:
  identifying another different name for the video content segment at the alternative server, which employs a different naming convention for video content segments from both the server receiving the first request for the video content segment and from the upstream server, and wherein transmitting the alternative request to the alternative server comprises transmitting the other different name for the video content segment at the alternative server.

15. The non-transitory computer-readable storage medium of claim 10, wherein the upstream server is more proximal to an origin server than the server receiving the first request for the video content segment.

16. The non-transitory computer-readable storage medium of claim 15, wherein the upstream server includes the origin server.

17. The non-transitory computer-readable storage medium of claim 16, operable to cause data processing apparatus to perform operations comprising:
  determining, based on the name for the video content segment, whether the video content segment is available locally at the server and when the video content segment is available locally, transmitting the locally available video content segment to at least one downstream server, wherein the at least one downstream server is more distal from the origin server than the server receiving the first request for the video content segment.

18. A system for communicating between servers in a server architecture, the system comprising:
  one or more nodes in a network; and
  hardware including one or more processors and one or more memory devices effecting at least one server configured to perform operations, comprising:
    receiving, at the server, a first request for a video content segment of a segmented video stream, where
      the segmented video stream comprises a plurality of video frames and a plurality of audio samples, and
      the first request includes a name for the video content segment;
    creating a connection with at least one upstream server;
    identifying, at the server receiving the first request for the video content segment, a different name for the video content segment at the upstream server, which employs a different naming convention for video content segments from the server receiving the first request for the video content segment, wherein the different name for the video content segment is not based on a network resource locator; and
    transmitting a second request for the video content segment to at least one upstream server, the second request identifying the different name for the video content segment.

19. The system of claim 18, wherein the at least one server is further configured to perform operations comprising:
  identifying the different name for the video content segment in at least one mapping database stored locally at the server receiving the first request for the video content segment.

20. The system of claim 18, wherein the at least one server is further configured to perform operations comprising:
    identifying the different name for the video content segment in at least one mapping database stored external to the server receiving the first request for the video content segment.

21. The system of claim 18, wherein the at least one server is further configured to perform operations comprising:
    transmitting an alternative request for the video content segment to an alternative server.

22. The system of claim 21, wherein the at least one server is further configured to perform operations comprising:
    identifying another different name for the video content segment at the alternative server, which employs a different naming convention for video content segments from both the server receiving the first request for the video content segment and from the upstream server, and wherein transmitting the alternative request to the alternative server comprises transmitting the other different name for the video content segment at the alternative server.

23. The system of claim 18, wherein the upstream server is more proximal to an origin server than the server receiving the first request for the video content segment.

24. The system of claim 23, wherein the upstream server includes the origin server.

25. The system of claim 24, wherein the at least one server is further configured to perform operations comprising:
    determining, based on the name of the video content segment, whether the video content segment is available locally at the server and when the video content segment is available locally, transmitting the locally available video content segment to at least one downstream server, wherein the at least one downstream server is more distal from the origin server than the server receiving the first request for the video content segment.

26. A non-transitory computer-readable storage medium encoding a computer-based application programming interface (API) system for communicating with one or more servers in a server system, comprising:
    an API comprising functions for:
        receiving, at a computing device, a first request for a video content segment of a segmented video stream, where,
            the segmented video stream comprises a plurality of video frames and a plurality of audio samples, and
            the first request includes a name for the video content segment, the name being controlled by a server side action script developer;
        creating a connection with an upstream server;
        determining, based on the name for the video content segment, whether the video content segment is available locally at the computing device;
        when the video content segment is not available locally at the computing device,
            identifying a different name for the video content segment at the upstream server, which employs a different naming convention for video content segments from the computing device, wherein the different name for the video content segment is received from a content management system or a stream provisioning system; and
            transmitting a second request for the video content segment to the upstream server, the second request identifying the different name for the video content segment.

27. The API system of claim 26, wherein the API further comprises functions for:
    identifying the different name for the video content segment in at least one mapping database stored locally at the computing device.

28. The API system of claim 26, wherein the API further comprises functions for:
    identifying the different name for the video content segment in at least one mapping database stored external to the computing device.

* * * * *